US007832324B2

(12) United States Patent
Green et al.

(10) Patent No.: US 7,832,324 B2
(45) Date of Patent: *Nov. 16, 2010

(54) FIRE MITIGATION

(75) Inventors: Anthony Green, Auckland (NZ); Sally Leivesley, Auckland (NZ)

(73) Assignee: Flexiblast Pty Ltd., Wooloongabba, Queensland (AU)

( * ) Notice: Subject to any disclaimer, the term of this patent is extended or adjusted under 35 U.S.C. 154(b) by 971 days.

This patent is subject to a terminal disclaimer.

(21) Appl. No.: 10/579,923

(22) PCT Filed: Nov. 24, 2004

(86) PCT No.: PCT/GB2004/004945

§ 371 (c)(1),
(2), (4) Date: Nov. 20, 2006

(87) PCT Pub. No.: WO2005/052088

PCT Pub. Date: Jun. 9, 2005

(65) Prior Publication Data

US 2008/0229969 A1  Sep. 25, 2008

(30) Foreign Application Priority Data

Nov. 24, 2003  (GB)  ................. 0327310.9

(51) Int. Cl.
F41H 5/02 (2006.01)
C08L 89/00 (2006.01)

(52) U.S. Cl. .................... 89/36.02; 89/36.04; 89/36.05; 106/160.1; 428/920; 428/921

(58) Field of Classification Search ............... 89/36.02, 89/36.04, 36.05; 106/160.1; 428/220, 920, 428/921
See application file for complete search history.

(56) References Cited

U.S. PATENT DOCUMENTS

| | | | |
|---|---|---|---|
| 3,398,007 A | 8/1968 | Pillersdorf et al. | |
| 3,818,234 A | 6/1974 | Atkins et al. | |
| 4,102,807 A | 7/1978 | Iwama et al. | |
| 4,246,146 A | 1/1981 | Wood et al. | |
| 4,331,547 A | 5/1982 | Stotts et al. | |
| 4,994,317 A * | 2/1991 | Dugan et al. | 442/72 |
| 5,124,208 A | 6/1992 | Bolton et al. | |
| 5,223,313 A | 6/1993 | Holzer et al. | |
| 5,225,236 A | 7/1993 | Keusch et al. | |
| 5,394,786 A | 3/1995 | Gettle et al. | |
| 5,496,640 A | 3/1996 | Bolton et al. | |
| 5,698,277 A | 12/1997 | Schueller et al. | |
| 6,136,216 A | 10/2000 | Fidler et al. | |
| 6,469,129 B1 | 10/2002 | Cook et al. | |
| 6,485,446 B1 | 11/2002 | Brother et al. | |
| 6,560,787 B2 | 5/2003 | Mendoza | |
| 7,019,459 B2 | 3/2006 | Mieda et al. | |
| 7,294,348 B2 | 11/2007 | Lopatin | |
| 2003/0004247 A1 | 1/2003 | Destandau et al. | |
| 2008/0229969 A1 | 9/2008 | Green et al. | |

FOREIGN PATENT DOCUMENTS

| | | |
|---|---|---|
| DE | 35 06 132 A1 | 8/1986 |
| DE | 102 37 395 A1 | 8/2003 |
| EP | 0 192 249 | 8/1986 |
| EP | 0 875 492 A1 | 11/1998 |
| GB | 1 361 504 | 7/1974 |
| GB | 2 100 845 A | 1/1983 |
| GB | 0 352 069 A2 | 1/1990 |
| GB | 2 262 885 A | 7/1993 |
| GB | 2 301 122 A | 11/1996 |
| JP | 5-254896 | 10/1998 |
| WO | 02/08139 A2 | 1/2002 |
| WO | WO 03/101234 A2 | 12/2003 |
| WO | 2004/044520 A1 | 5/2004 |
| WO | WO 2005/042600 A2 | 5/2005 |
| WO | WO 2005/100903 A1 | 10/2005 |

OTHER PUBLICATIONS

Thesis submitted to the faculty of Drexel University by Jovan M. Jovicic Apr. 2003.
International Search Report of PCT/GB2004/004952, mailed Apr. 12, 2005.
GB Search Report of GB 0327310.9, dated Jun. 24, 2004.
Smith et al; "The Use of Alcohol Resistant-Aqueous Film Forming Foam (AR-AFFF) Delivered with a Compressed Air Foam System (CAFS) as a Blast Mitigant", The Journal of Explosives Engineering, pp. 18-19, 22-23. date unknown.
Burky, "The Suppression of Blast Effects from Large Vehicle Bombs, EOD Operations and Demilitarization Ranges", presented at the World EOD Foundation Conference, Esher, UK, Nov. 1999.
Burky, "The Reduction to Practice of the Blast Effects Suppression System, HydroSuppressor™ ", Final Report on Battelle Columbus Operations FY 1999, Independent Research and Development, Sep. 30, 1999.
Knox et al "Polyester Materials for Structural Retrofit". date unknown.

* cited by examiner

*Primary Examiner*—Lynda Salvatore
(74) *Attorney, Agent, or Firm*—Nixon & Vanderhye P.C.

(57) ABSTRACT

A method for protecting a structure or organism from the effects of fire caused by an explosion comprising covering at least a part of said structure or organism in a barrier comprising a water gel.

13 Claims, 2 Drawing Sheets

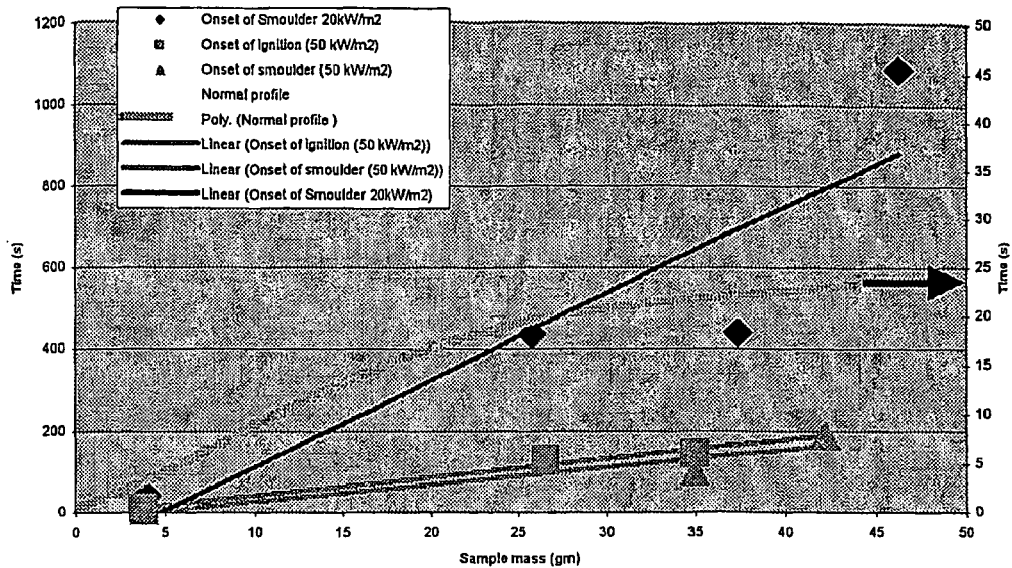
Figure 1 Effect of sample thickness on smouldering and ignition times
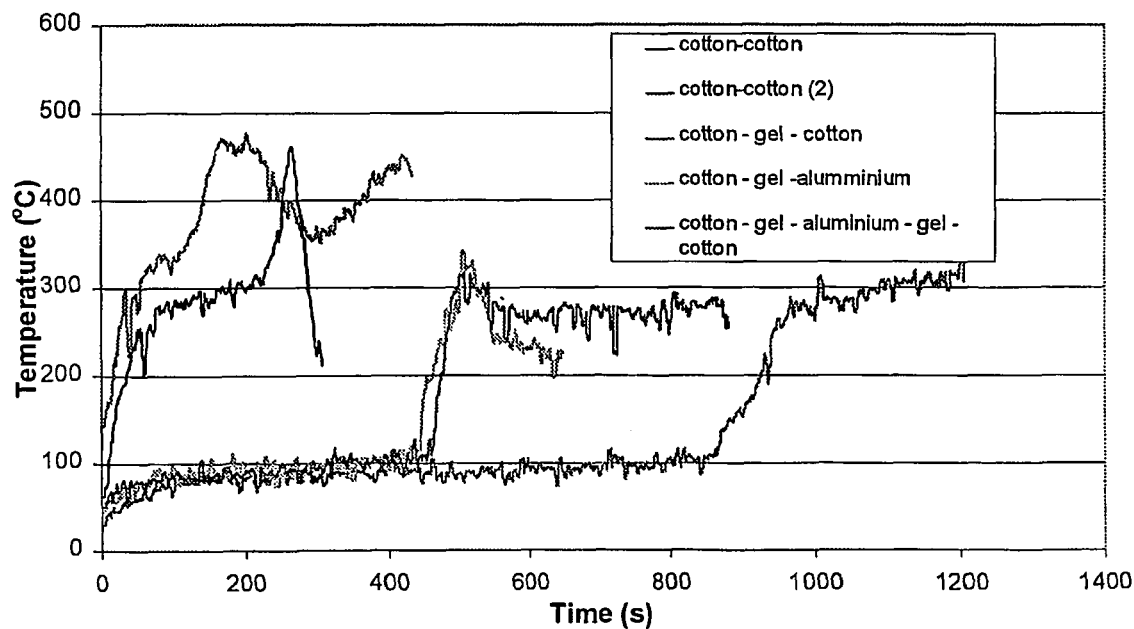
Figure 2 Temperature measurements at 20 KW/m$^2$ irradiance – the thermocouple was between the bottom two layers.

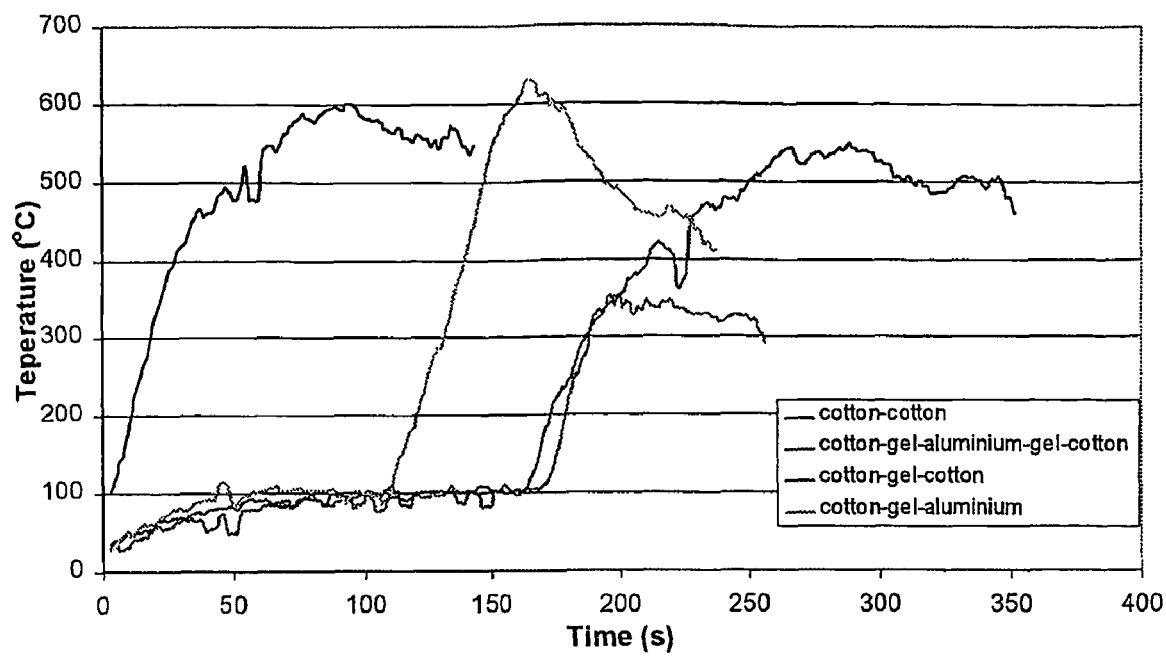
Figure 3 Temperature measurements at 50 KW/m$^2$ irradiance – the thermocouple was between the bottom two layers.

FIRE MITIGATION

This application is the US national phase of international application PCT/GB2004/004945, filed 24 Nov. 2004, which designated the U.S. and claims priority of GB 0327310.9 filed 24 Nov. 2003, the entire contents of each of which are hereby incorporated by reference.

This invention relates to the use of a water gel material to protect an entity from the effects of fire and to methods of applying the material and to the material itself. In particular, the invention relates to the use of water gels to form a material which can prevent fires igniting and spreading after an explosion.

The use of water gels as fire retardants is well known. In EP 875492 for example, there is described a hydrated sodium silicate, i.e. water glass as a fire retardant material. In EP 192249 a layer of gel which consists of a hydrogel comprising silicone dioxide, sodium oxide and the reaction product of an acid and sodium water glass is described. In US 2003/0004247 a variety of different polymers are suggested as being fire mitigants. Acrylamide appears to be the preferred choice. Acrylamides are also suggested in U.S. Pat. No. 5,124,208 with a 2-hydroxy-3-methyacryloxypropyltrimethylammonium chloride being suggested in U.S. Pat. No. 5,223,313 as a suitable component of a gel based fire protective layer.

The majority of these fire protection gels are employed as construction components in buildings, in particular in fire retardant glazing in which the gel is encased between two panes of glass. These fire retardant materials are installed in buildings to prevent the spread of fire through a structure thus giving personnel more time to evacuate and giving the fire service more time to put out a fire.

The inventors on this case have found however that water gels, in particular a gelatin water gel, can act not only to mitigate the effects of fire and prevent its spread but also to prevent fires igniting in the first place in view of their ability to withstand the pressure effects of an explosive blast and their ability to absorb heat.

One of the normal consequences of an explosion is fire and conventional fire retardant materials do not prevent fires starting in the aftermath of an explosion. The materials may simply ignite due to the intense heat of an explosive fireball or they may also be damaged by the pressure wave of an explosion rendering them unable to function as fire retardants.

The water gels of the present invention have been surprisingly found to possess pressure mitigation properties, e.g. they can absorb the shockwave which results from an explosion. Moreover, the water gels can resist the fireball which results from an explosion thus providing a material ideally suited to protecting entities against the pressure and heat effects of explosions.

Since the mid 1990's there has been an increase in the use of explosives by criminal organisations against civilian and military targets throughout the World. Their use results in death, injury and destruction of property and buildings. Previously, mitigation of explosion relied upon intelligence and police detection to provide warning of impending attack but recent events make it clear that intelligence and police operations alone cannot be relied upon to prevent explosions. Moreover, some explosions are caused simply by accident, e.g. gas or chemical explosions, and it would be useful if the consequences of such accidental explosions could also be minimised.

Conventional construction can give rise to buildings which will withstand many types of impact but it is still difficult to minimise the effects of explosions and in particular the fire associated therewith. Whilst there are a number of solutions to the problem of damage caused by the pressure effects of an explosion no material is currently available that is capable of dealing both with the pressure and heat effects of a zero warning explosion.

There are a number of reports of conventional fire fighting foams being employed as pressure mitigants (Journal of Explosives Engineering, Vol 26, No. 3, 1999). Such foams have the additional advantage of preventing fires often associated with explosions. However, the use of these foams requires that the explosive can be surrounded by the foam in a contained environment. Whilst this is possible when the source of an explosion is identified, where an explosion occurs without warning these foams cannot be used. Nor do these foams allow access to an explosive source by persons working to mitigate an accident or defuse a device controlled by criminals.

A somewhat similar system is sold under the trade name Hydrosuppressor. The system involves spraying the explosive or spraying the area in the vicinity of the explosive with water from various angles. Again however, this technique relies on the identification of an existence of a threat of an explosion prior to any explosion taking place. No material which can be affixed to a structure is therefore available.

The present inventors have surprisingly found that mixtures of water and gels (from hereon water gels) are particularly suitable for use as barriers to prevent damage caused by explosions. Moreover, in view of the inherent aqueous nature of the gel they also act to protect against fire. The inventors have surprisingly found that water gels can be formed into structures which can withstand significant over-pressures compared with materials currently used in buildings. Without wishing to be limited by theory, it is envisaged that the inherent elasticity of the water gel makes it an excellent material for absorbing the shockwave of an explosion. Moreover, the aqueous nature of the water gel ensures that it is also capable of resisting heat, flash and quenching flame thereby preventing fires igniting, a cause of much injury in the aftermath of an explosion.

The particular requirements of resisting a fireball which results from an explosion are very different from conventional fire retardation. The critical factor with a fireball is preventing ignition whereas conventional fire retardation primarily concerns preventing fire spreading once ignition occurs.

When combined with other materials, the water gels of the invention act synergistically to prevent fire ignition in the aftermath of an explosion. Surprisingly, in the presence of the water gel other materials are prevented from shredding in the initial explosion. This means that the other materials remain intact and can therefore act as fire retardants.

SUMMARY OF INVENTION

Thus, viewed from one aspect the invention provides a method for protecting an entity, e.g. structure or organism from the effects of fire caused by an explosion comprising covering at least a part, e.g. at least 10%, preferably all of said entity in a barrier comprising a water gel.

Viewed from another aspect the invention provides a method for preventing fire in a structure in the aftermath of an explosion comprising covering at least a part, e.g. at least 10%, preferably all of said structure or organism in a barrier comprising a water gel.

Viewed from a still further aspect, the invention provides a fire-retardant barrier comprising gelatin and water, wherein the concentration of gelatin is at least 3% w/w.

DETAILED DESCRIPTION OF THE INVENTION

By protecting a structure or organism from the effects of fire is meant, inter alia, preventing fires igniting and/or spreading. Thus, the water gels of the invention may protect entities against heat, flame and fire which result from explosions, e.g. by preventing fires igniting.

By entity is meant anything which should be protected from fire, e.g. structures, organisms and the general physical environment. An organism is a living plant or animal, e.g. a human. By structure is meant any inanimate object which could be protected from explosive damage such as buildings (temporary or permanent), industrial plant, civil infrastructure, vehicles, military equipment, computers etc.

By definition, the water gels of the invention comprise an aqueous component. For this reason, they are capable of absorbing heat and dousing flame much more efficiently than other zero warning explosion mitigation materials.

When exposed to heat, it is envisaged that the water gel may partially or completely melt thereby releasing water to help quench any fire and absorbing heat. Moreover, during an explosion, the water gel may first absorb the pressure effects of the explosive blast and heat associated therewith and subsequently melt to prevent associated fire damage.

The water gel barriers of the invention may also help in the event of a conventional fire, particularly in a building in which the external structure is predominantly made from glass. During a fire in such a building, the metal frame of the building tends to expand and the windows can therefore fall out of their frames. The presence of a water gel will slow down any expansion of the building frame thereby allowing firefighters more time in which to control the fire.

The water gels of the invention are more effective at mitigating the effects of fire at lower gel concentrations, i.e. higher water concentrations. However, the water gels are more effective at blast impulse mitigation at higher gel concentrations. It is therefore within the scope of the invention to provide a multilayer barrier comprising water gel layers having varying gel concentrations to provide barriers tailored to mitigate the effects of both fire and pressure. The water gels are able therefore to withstand a fireball and the pressure effects which result from an explosion so that the fire cannot penetrate the material. Outer portions of the gel may evaporate as steam but the internal layers delay the residence time of the flame to the extent that the materials behind the gel will be protected.

By water gel is meant a mixture of water and a gel to form a solid elastomeric barrier. The gel should preferably be non-toxic and cheap to manufacture or isolate. It should exhibit elastomeric properties, have a high elastomeric modulus and a high ductility. Suitable gels include gelatin, gellan gum gels, poly(gamma-benzyl-L-glutamate) (PBLG), agar (preferably composed of 70% agarose, a gelsaccharide and 30% agaropectin), collagen, protein gels, polysaccharide gels, keratin gels, hydrogels, ormosils (organically modified silicates often of formula $(R'_n Si(OR)_{4-n}$ in which R is typically an alkyl group and R' an organic group), sol-gels, hydrophilic polymer gels, and glycoprotein gels. Other suitable gels include bio-gels such as carrageenans, pectins, alginates (e.g. xanthan alginates casein), seed gums, egg protein g and Gelacrimide gels. Mixtures of gels can be employed.

These gels can be obtained from commercial sources. A preferred gel is gelatin.

The gelatin preferably has a molecular weight range of 20,000 to 300,000 D, e.g. 20,000 to 150,000 D and can be made from the hydrolysis of collagen.

A further advantage of the use of gelatin lies in the fact that it is not toxic. Many conventional fire retardant materials burn to yield toxic, i.e. poisonous by products. In sharp contrast, the gelatin water gel yields non-toxic by products as the water steams off. This means that the toxicity of fires in structures will be much less, thereby allowing additional escape times for individuals because the air quality during the growth of a fire will not deteriorate as quickly as it does when the toxic by products of fire retardants start to burn.

Toxicity in a fire arises from two mechanisms a) the breakdown of the fuel into smaller molecules which have significant toxicity and b) the lack of oxygen available to the fire which results in high concentrations of carbon monoxide.

The toxicity of the gel will be low compared to conventional retardants, which usually have components that yield very high toxicity when they eventually burn e.g. fluorine, chlorine, phosphorus and arsenic compounds.

This makes a gelatin water gel particularly suitable for use in confined spaces such as in buses, cars, ships and planes and in buildings where persons may be trapped. There is also a particular advantage in the environmental impact of this material under fire conditions as it will not add an excessively high toxic load to the environment when burning over large surface areas protected externally and internally by the material—for example, tanks on petrochemicals sites which may be engulfed in fire or ships in port when burning would not cause an additional toxic loading on the environment for emergency services and persons entrapped or escaping from these structures.

Thus, viewed from another aspect the invention provides a method for protecting a structure or organism from the effects of fire comprising covering at least a part, preferably all of said structure or organism in a barrier comprising a gelatin and water.

The mixture of water and gel should comprise at least 3% by weight of the gel, e.g. between 3% by weight and 40% by weight of gel, preferably at least 4% by weight gel, especially at least 5% by weight gel, e.g. in the range 7% by weight to 25% by weight gel, e.g. 8 to 15% wt.

As mentioned above, it is within the scope of the invention to employ a multilayered water gel where the gel becomes more concentrated from the outside in. Thus, an outside layer may comprise 5% wt of the gel. An inner layer may therefore comprise 10% wt of the gel. The more aqueous layer is this able to withstand heat whilst the less aqueous layer absorbs the blast shockwave.

Another property of the water gel is its stress relaxation, with values in the range 0.05 to 0.3 kPa being preferred. Higher stress relaxation values indicate an increased ability to withstand impulse pressure.

The water gels of the invention should preferably have an elastic modulus in the range of 100 to 1000 kPa, preferably 120 to 900 kPa, more preferably 300 to 800 kPa, e.g. 700 to 800 kPa.

Mixing of the water and gel can be achieved by any convenient means, preferably with stirring or sonication to ensure complete mixing. Thus, the hot gel can be mixed with water in a mould and allowed to cool to form the water gel elastomeric barrier of the invention. The water used may be deionised or distilled if desired but this is not essential. Other sources of water such as tap water are also employable. The resulting mixture is suitable for use as a protective barrier.

The water gels are inherently non-flammable, cheap and non-toxic making them very attractive building materials.

The water gel mixture can be formed into sheets to provide protective barriers which mitigate the effects of fire and explosion. The thickness of a protective barrier or sheet may vary depending on the nature of the barrier, e.g. whether it is being used to protect windows, personnel, buildings etc. However, suitable thicknesses are in the range 0.1 cm to 1 m, e.g. 1.5 cm to 20 cm, preferably 2 cm to 10 cm.

Suitable thicknesses for sheets to be used in building cladding are in the range of 10 to 100 mm preferably 10 to 20 mm. Where the material is used to cover windows suitable thickness is in the range of 10 to 50 mm. When the material is used in clothing suitable thickness is in the range of 10 to 15 mm.

In order to protect the barrier material against degradation by, for example, bacteria or light it may be essential to mix the water gels with antibacterials (e.g. sodium azide) or proteinase inhibitors such as EDTA (e.g. at 5 mM concentration), detergents and/or antioxidants as additives in the water gel formulations. Other additives include colouring agents to produce a tinted product, emulsifiers, viscosity modifiers, organic additives (such as xanthum gum, starch), inorganic additives (such as sodium sulphate, calcium salts, magnesium sulphate, ammonium sulphate) can be employed.

Thus, the water gel layer in the barrier of the invention should preferably comprise at least 50% by weight of water gel, more preferably at least 80% by weight, especially at least 95% by weight of water gel, e.g. 98% wt. Ideally, the water gel layer should consist essentially of water and gel (i.e. incorporates only minor quantities of impurities or standard additives) or consists of water and gel.

In general, the water gel barrier of the invention is an insulator although it can comprise conductive materials if required. In the aftermath of an explosion, the fact that the material is an insulator may prevent electrical fires starting and may prevent electrocution of individuals and destruction of equipment.

The barrier of the invention is preferably multilayered and comprises at least one water gel layer. Layers of water gel could be mixed with layers of other pressure mitigating materials or layers of fire retardant material to form composites. It has surprisingly been found that the combination of the water gel with certain other materials yields a multilayer material which provides synergistic fire and pressure reduction, i.e. the capacity of the multilayer material to withstand fire is greater than what is achieved using either material alone.

Thus, a water gel layer or layers may be combined with a layer of metal (e.g. aluminium or steel), a ceramic layer, a polymer layer (e.g. a polyethylene, polypropylene or polycarbonate layer), a fabric layer (e.g. cotton layer), a fibreglass layer, or a dilatant layer (e.g. a polyethylene oxide layer or a silicone layer), or mixtures of such layers.

A dilatant is a material which thickens upon applied shear stress, e.g. may turn solid upon applied shear stress and examples thereof are polyethylene oxides and silicones. Where a polyethylene oxide layer is employed this may be in the form of an at least 0.5 wt % aqueous mixture, e.g. at least 1% wt aqueous mixture.

This forms a further aspect of the invention which therefore provides a fire retardant barrier comprising a water gel layer and a layer of metal, e.g. aluminium or steel, ceramic layers, a polymer layer (e.g. a polyethylene, polypropylene or polycarbonate layer), a fabric layer e.g. cotton layer, a fibreglass layer, or a dilatant layer e.g. a polyethylene oxide layer or a silicone layer, or mixtures of such layers.

Preferably, the multilayer barrier can comprise a plurality of gel layers and other material layers, e.g. as described in the Examples.

The thicknesses of the additional layers can of course vary. Typically however, additional layers can be of the order of 1 mm to 10 cm in thickness, e.g. 1 mm to 10 mm.

The fire resistance of, for example, a fabric layer such as cotton can therefore be greatly enhanced if there is a layer of gel behind and/or in front of the fabric. For normal fire retardant materials the initial heat and residence time of a fireball would render such materials useless to prevent fire in the aftermath of an explosion. For example, a 30 tonne propane fireball will last 12 seconds and be approximately 90 m in diameter. Most materials within 115 m of the explosion will ignite in this time and burns will be sustained up to 230 m away. The water gels of the invention can withstand such a fireball for 100-200 seconds i.e. sufficient to prevent a fire starting.

A further advantage of the water gel is that it prevents the other material present from shredding. Typically, materials which are exposed to high pressure blast effects shred. The clothes of individuals caught in explosive blasts are very often seen shredded. This obviously exposes the skin to the heat of the explosion directly and gives rise to serious burns. The water gel of the invention protects against the pressure shockwave and thus prevents shred. A person in clothing comprising the water gels of the invention will not therefore have his clothing shredded and will not therefore receive severe burns to the unprotected flesh under the shredded clothing.

In this regard, it is particularly preferred in the water gel layer wets (i.e. is in contact with) a layer which is exposed to the effects of an explosion. Thus, if a fabric layer is outermost then directly beneath that layer should be a water gel layer.

Such a multilayered composition could have important applications in the military and for the general public close to industrial sites such as chemical storage facilities, nuclear reactors or research laboratories or areas where transportation of hazardous materials occurs. Such compositions could be used in clothing to protect against, fire and explosion.

The invention may also have applications in space. Vehicles re-entering the Earth's atmosphere become very hot. Whilst the ceramic tiles which coat such vehicles normally withstand such heat, if any damage occurs to the tiles a water gel layer beneath the tiles would help to absorb the heat and prevent fire. Moreover, the presence of a water gel under the ceramic tiles might make these more likely to withstand space debris contact. The impact of space debris on the tiles could be absorbed by the water gel layer preventing potential disaster. The recent shuttle explosion was caused by damage to ceramic tiles caused by a part detaching during take off. The tiles failed on re-entry.

The water gel can be formed into any suitable shape or form depending on the nature of the barrier desired. The water gels of the invention can be formulated into sheets using known techniques such as injection moulding or thermal cooling of the material. The width of the material will depend on the nature of the use. Thus, water gel sheets could be used as building cladding or formed into thin sheets for covering equipment such as computers.

When used as a protective layer over building cladding, it is most important that the lower part of the building is protected from the effects of a blast and subsequent fire. Thus, the protective water gel barrier may be adhered only to the lower part of a building, e.g. the bottom three floors since this is the area which suffers from the greatest blast impact from a ground based explosion. The protective water gel barrier may be continued inside the building on partitions or inside walls to strengthen the structural resistance to blast and prevent the spread of fire. The material may also be used as a protective surface across the whole façade of a building to protect against explosive pressures from very large explosions or from air-borne contaminants from an explosion.

Water gels may also be formulated as protective blankets or clothing for personnel. Alternatively, very large sheets of water gel could be produced for covering critical environmental areas, e.g. reservoirs, or iconic targets. Temporary structures, in particular temporary military structures, may be covered with this material to mitigate the impact of explosions and fire on buildings equipment and personnel.

For convenience, the material for permanent or temporary fixing across doors, windows, on horizontal or vertical surfaces etc may be in rolls that can be cut to create barriers. The material may also be extrudable.

The forming of the water gels into desired shapes can be achieved easily using known equipment, e.g. those used in the food industry to make jelly or those used in the pharmaceutical industry to make capsules.

The material of the invention may also provide a barrier to chemical or biological contamination, e.g. as the result of a criminal attack or chemical leak. Explosions at a chemical factory or involving terrorism may involve leakage of chemicals or biological contaminants and the water gel materials of the invention may serve to provide a barrier to such leaks. The surface of the water gel material is inherently sticky and hence biological and chemical compounds may attach to the surface of the material thereby preventing further contamination taking place. Additionally the water gel material acts as a barrier that, unlike most open weave material, prevents biological materials under the size of 5 microns from passing through to the surface of a material below.

The water gel material may also act as a barrier to alpha and beta particles of radiation that may be present in sources used in industry and in weapons used by the defence forces. Moreover, if a water gel layer was combined with, for example, a boron layer a broader range of radiological effects could be preventable. Thus, gamma radiation or neutrons could be absorbed by a water gel barrier comprising a boron layer.

Water gel sheets also provide the added advantage that post contamination clean up is made much simpler. Since the chemical or biological agent may stick to or dissolve within the water gel, clean up can be effected simply by removing the water gel sheet from the structure in question.

In some applications there may be several layers to provide various protections from heat and blast with an optional top layer being a throw away contaminatable layer.

It is a particular advantage of the material of the invention that it can be made transparent and hence does not affect the amount of light entering a building when used as a window protector or affect the external appearance of a building when used as a cladding. Transparency is enhanced when the pH of the material is less than 8. Fixing the material to a structure can be achieved using conventional techniques. For example, for window protection, the material may be adhered to the window surface (inside and/or outside) using known adhesives such as ceramic bonds or other bonding materials that adhere to wood, concrete or glass surfaces. These materials are readily available through suppliers to dentists for bonding of ceramic veneers to teeth, and in the construction industry for bonding materials together.

It is particularly advantageous if the bond between the water gel sheets and the window is stronger than the fixing holding the window frame into the wall.

Within clothing or where sheets are being bonded together to create large surface areas for protection the use of these industrial bonding agents may create seams that should be stronger than the water gel material and protect large surface areas from the pressure of being split at the seams.

The material could be placed in wall cavities, double glazing cavities, or roof space or secured to the outside of a building by adhesives or in a frame. The person skilled in the art can devise alternative methods of fixation.

Other forms of encapsulation of layers of the water gel material may involve vacuum sealing and the use of hydrostatic films as is known in the art. The gels may be acidic or basic giving rise to further options for fixation as well as further options for chemical or biological absorption and as a general absorber of pollutants.

The water gels of the invention may also have particularly utility in the prevention of flash fires. In a flash fire the flame is characterised by rapid burning. The flame temperature is normal but the emissivity of the flame is much higher than in a typical fire leading to higher radiant heat fluxes on material surfaces. The water gel of the invention would resist heat better than conventional fire retardant materials and hence is more effective at preventing ignition. The water gel would also work in oxygenated atmospheres where there is a fire (some ships). In such environments, much hotter flames exist and there is again increase in heat flux to surfaces.

The water gels of the invention are therefore able to withstand flash fires as they are exceptional at absorbing heat. Thus water gels might be employed in places were flash fires are possible, e.g. in tunnels.

The water gels are also particularly suitable for preventing arson where heat flux is unconventionally high. Materials treated with water gels are therefore better able to prevent ignition in arson attempts. Sheets of water gel material could therefore be used to cover tanks or sumps which contain flammable material. The gel thus provides a barrier to conventional ignition sources such as cigarettes, friction sparks, lighter fuels and electrical sparks.

The water gels of the invention may serve to protect organisms against flame burns from secondary contact with hot objects.

A further advantage of the invention is that the material itself can be transported in solid form, e.g. powder form, and made up to the water gel when required. A potential difficulty with the water gels may be their weight but the fact that the material can be transported as a powder and made into the water gel only when required is a major advantage.

The invention will now be further described with reference to the following non-limiting examples and FIGS. 1 to 3.

BRIEF DESCRIPTION OF THE FIGURES

FIG. 1 shows the effects of sample thickness on smouldering and ignition times for water gel barriers of the invention.

FIGS. 2 and 3 show temperature measurements for the water gel samples

EXAMPLE 1

A number of gel samples with cotton fibre and aluminium foil embedded within them were tested on a cone calorimeter to establish their effectiveness in preventing ignition of the cotton fibre protected by gel layers. The results show that the gel delays the transfer of heat to any protected surface thereby delaying ignition. The delay is proportional to the water content of the gel for a given incident heat flux.

Experimental:

A number of 100 mm×100 mm gel samples were made in which a 10% gelatin water gel of 3 mm thickness was embedded between layers of cotton (1 mm) or cotton and aluminium foil (50 micron). A description of the samples is given in Table 1. The water gel was formed simply be mixing water and gelatin in the required amounts to form a 10% wt gelatin water gel.

These samples were tested in a cone calorimeter at a constant heat flux of 20 kW/m² and 50 kW/m² respectively to determine the effect of gel on ignition times. The Cone Calorimeter subjects a sample test piece to a constant radiant heat flux for the duration of the test. The heat flux can be varied in successive tests and each tests give information about the ignition and heat soak characteristics of the material.

In addition, a thermocouple was placed between the upper surface of cloth and the lower surface of the gel in the samples to measure the effect of heat transfer through the gel to the protected surface underneath.

TABLE 1

Samples used in Cone Calorimeter tests

| Sample No | Sample | Mass | Approx. Thickness |
|---|---|---|---|
| 1 | Double cloth layer | 4 | 2 mm |
| 2 | Cloth layer - Gel - cloth layer | 44 | 5 mm |
| 3 | Cloth layer - Gel - aluminium Layer | 26 | 5 mm |
| 4 | Cloth layer - aluminium Layer - gel - cloth layer | 36 | 5 mm |

Results:

The time to either smouldering or ignition as a function of mass of the sample is plotted in FIG. 1. As the surface area of different samples is constant in different tests, this is equivalent to a variation as a function of sample thickness. Smouldering was indicated by browning of the top material layer, usually starting at the edge of the sample which was not well protected by the gel layer. Smouldering was only observed after boil off of the gel layer protecting the fabric. Ignition was indicated by an established flame on the surface of the sample and was observed to only occur after all the gel material had been boiled off in three tests at the higher irradiant heat flux.

A linear regression has been fitted to the data points in FIG. 1. The linear trend appears to be a reasonable representation of the data. This trend differs from the curve expected with the majority of materials subjected to a constant heat flux. The curve that would normally be observed initially increases linearly in time as the thickness (and hence mass) increases from a thermally thin material to a thermally thick one. Once the thermally thick limit is reached the increase tends to an asymptotic value at large thickness. This limit is usually no more than a couple of centimetres for most materials. Such a typical response is also shown on FIG. 1 as a comparison to the test results.

The linear behaviour of the gel samples is indicative of boiling off the water from the gel at 100° C. This is confirmed by the thermocouple records where the temperature at the base of the main gel layer remained about 100° C. until after the water had boiled away from the area of the thermocouple. This is shown in FIGS. 2 and 3 for irradiant heat fluxes of 20 kW/m² and 50 kW/m² respectively. Smouldering and ignition occurred after the temperature rose with ignition being consistent with a temperature of greater than 400° C. In FIG. 2, the reading for the thermocouple is too high as the pressure of the thermocouple between the two layers due to the method of mounting caused the top surface to lift. This problem was overcome for the other tests.

Table 2 shows the time and peak heat release rate per unit area of the materials. The only samples where the heat release rate is significant is in the three samples that ignited. The onset of the peal occurs after the water has boiled away in those samples that have a gel layer.

TABLE 2

Peak Heat Release.

| Sample Configuration | Irradiance kW/m2 | Time of peak onset s | Time of peak maximum s | Peak heat Release Rate KW/m2 |
|---|---|---|---|---|
| double cotton fabric | 20 | — | — | <2 |
| double cotton fabric | 20 | 150 | 320 | 8 |
| Cotton Cloth - Gel - Cotton Cloth | 20 | 0 | 15 | 2.7 |
| Cotton Cloth - Gel - Aluminium Foil | 20 | 480 | 540 | 18 |
| Cotton Cloth - Aluminium foil - Gel - Cotton Cloth | 20 | 240 | 245 | 0.07 |
| double cotton fabric | 50 | 25 | | 112 |
| Cotton Cloth - Aluminium - Gel - Cotton Cloth | 50 | 165 | 185 | 72 |
| Cotton Cloth - Gel - Cotton Cloth | 50 | 220 | 285 | 15 |
| Cotton Cloth - Gel - Aluminium Foil | 50 | 150 | 165 | 64 |

The results indicate that the gel would act as a protective layer to surfaces underneath as the requirement to boil off the water before the underlying surface could be heated to the ignition temperature would delay ignition proportional to the amount of water in the gel and the thickness of the gel layer. For example a 3 mm thick protective layer of 10% gel in water would delay ignition by about 130 s at a heat flux of 50 kW/m² based on the above data. This is a significant delay as this level of heat flux represents a fully involved fire. At this fire intensity most non fire retarded surfaces would ignite in under 10 s, and even chemically fire retarded surfaces would ignite in under 50 s.

Ignition usually involves lower heat or energy fluxes to surfaces than a fully involved fire. The tests undertaken at 20 kW/m² show that at this level ignition does not occur and only materials above the gel layer smoulder. The lowest fibre layer is protected until all gel material has boiled off. Smouldering does not occur for over 400 s for a 3 mm protective layer of gel. The gel therefore prevents first ignition, as a considerable amount of energy has to be expended to boil off the water before ignition of the underlying surface occurs. Most common ignition sources do not have this amount of energy. The type of ignition sources involved with arson do have this type of energy but are unlikely to burn for more than 200 s if no other materials are ignited from an arson attempt. This is only half the time required to boil off a 3 mm gel level.

Gelatine gels have been shown to provide protection characteristics against fire by delaying heat transfer to underlying surfaces, delaying ignition of underlying surfaces and protecting underlying surfaces from the effects of a fully involved fire.

The invention claimed is:

1. A method for protecting an entity from the effects of fire caused by an explosion comprising covering at least a part of said entity in a barrier comprising a water gel wherein the barrier comprises multiple water gel layers in which the concentration of the gel increases from outside water gel layer to the inner water gel layer.

2. A method as claimed in claim 1 wherein said water gel comprises water and a gel selected from gelatin, gellan gum gels, poly(gamma-benzyl-L-glutamate) (PBLG), agar, collagen, protein gels, polysaccharide gels, keratin gels, hydrogels, ormosils, sol-gels, hydrophilic polymer gels, glycoprotein gels, carrageenans, pectins, alginates, seed gums, egg protein g and Gelacrimide gels or mixtures thereof.

3. A method as claimed in claim 2 wherein said gel is gelatin.

4. A method as claimed in claim 3 wherein the concentration of gel in water is in the range 5 to 40 wt %.

5. A method as claimed in claim 4 wherein the concentration of gel in water is in the range 5 to 15 wt %.

6. A method as claimed in claim 1 wherein said barrier comprises in addition to the water gel layers, at least one layer of a metal, a polymer layer, a fabric layer, a fiberglass layer, a ceramic layer or dilatant layer or mixtures of such layers.

7. A method as claimed in any one of claim 1 wherein said entity is a structure, organism or the physical environment.

8. A method as claimed in claim 7 wherein said structure or organism is a building, vehicle or human.

9. A method for protecting an entity from the effects of fire comprising covering at least a part of said entity in a barrier comprising a water and gelatin, wherein the barrier comprises multiple water gelatin layers in which the concentration of the gelatin increases from the outside layer to the inner layer.

10. A fire-retardant material comprising gelatin and water, wherein the barrier comprises multiple water gelatin layers in which the concentration of the gelatin increases from the outside layer to the inner layer and wherein the concentration of gelatin is at least 3% w/w in said outside layer.

11. A fire-retardant material as claimed in claim 10, wherein said fire retardant material comprises in addition to the water gelatin layers, at least one layer of a metal, a polymer layer, a fabric, a fiberglass layer, a ceramic layer or a dilatant layer or mixtures of such layers.

12. A fire-retardant material as claimed in claim 11, wherein said fire-retardant material comprises water gelatin layers and a cotton layer.

13. A fire-retardant material as claimed in claim 12, wherein said fire-retardant material further comprises a metal layer.

\* \* \* \* \*